US009685987B2

(12) United States Patent
Kim

(10) Patent No.: US 9,685,987 B2
(45) Date of Patent: *Jun. 20, 2017

(54) CASE FOR A HAND HELD DEVICE

(71) Applicant: LG Electronics Inc., Seoul (KR)

(72) Inventor: Jai-Chul Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/249,169

(22) Filed: Aug. 26, 2016

(65) Prior Publication Data

US 2016/0365887 A1 Dec. 15, 2016

Related U.S. Application Data

(63) Continuation of application No. 15/053,866, filed on Feb. 25, 2016, which is a continuation of application (Continued)

(30) Foreign Application Priority Data

Mar. 28, 2006 (KR) .................. 10-2006-0028094

(51) Int. Cl.
*H04B 1/3888* (2015.01)
*G06F 1/16* (2006.01)
(Continued)

(52) U.S. Cl.
CPC ......... *H04B 1/3888* (2013.01); *G06F 1/1624* (2013.01); *G06F 1/1656* (2013.01);
(Continued)

(58) Field of Classification Search
CPC .. H04M 1/0202; H04M 1/0283; H04M 1/026; H04M 1/0237; H04M 1/22;
(Continued)

(56) References Cited

U.S. PATENT DOCUMENTS 5,546,457 A    8/1996   Tomura et al.
6,839,430 B2 * 1/2005   Kwak ............... B29C 45/14688
                                                    379/368

(Continued)

FOREIGN PATENT DOCUMENTS

DE    19934707     2/2001
EP     0676781    10/1995
(Continued)

OTHER PUBLICATIONS

U.S. Appl. No. 15/053,866, Office Action dated May 10, 2016, 9 pages.
(Continued)

*Primary Examiner* — Raymond Dean
(74) *Attorney, Agent, or Firm* — Lee Hong Degerman Kang & Waimey

(57) ABSTRACT

A housing assembly for a mobile device includes a cover formed from optically transmissive material, and opaque material formed over a portion of the cover. The opaque material is arranged to define a display portion which is optically transmissive. The housing assembly further includes a frame sized to receive the cover, and a first housing structured to couple with the frame, such that the cover, the frame, and the first housing are structured to define an enclosure sized to contain electrical components for the mobile device.

29 Claims, 8 Drawing Sheets

Related U.S. Application Data

No. 14/967,192, filed on Dec. 11, 2015, now Pat. No. 9,450,631, which is a continuation of application No. 12/484,943, filed on Jun. 15, 2009, now Pat. No. 9,239,591, which is a continuation of application No. 11/602,748, filed on Nov. 21, 2006, now Pat. No. 7,599,709.

(51) Int. Cl.

| | | |
|---|---|---|
| *H04M 1/02* | (2006.01) | |
| *H04M 1/22* | (2006.01) | |
| *H04B 1/3816* | (2015.01) | |
| *B29C 45/14* | (2006.01) | |
| *B29C 45/16* | (2006.01) | |
| *B29L 31/34* | (2006.01) | |

(52) U.S. Cl.
CPC .......... *G06F 1/1662* (2013.01); *G06F 1/1671* (2013.01); *H04B 1/3816* (2013.01); *H04M 1/026* (2013.01); *H04M 1/0235* (2013.01); *H04M 1/0237* (2013.01); *H04M 1/22* (2013.01); *B29C 45/14* (2013.01); *B29C 45/16* (2013.01); *B29L 2031/3431* (2013.01); *H01H 2219/062* (2013.01); *H01H 2231/022* (2013.01); *H04M 2250/18* (2013.01); *H04M 2250/22* (2013.01)

(58) Field of Classification Search
CPC ......... H04M 2250/18; H04M 2250/22; H04M 1/0235; H04B 1/3816; H04B 1/3888; H01H 2231/022; H01H 2219/062; G06F 1/1671; G06F 1/1662; G06F 1/1656; G06F 1/1624; B29L 2031/3431; B29C 45/16; B29C 45/14
USPC ......... 455/550.1, 575.1, 575.3, 575.4, 575.8; 379/428.01, 428.02, 428.04, 433.01, 379/433.11, 433.12, 433.13, 437
See application file for complete search history.

(56) References Cited

U.S. PATENT DOCUMENTS

| | | | |
|---|---|---|---|
| 6,876,543 | B2 | 4/2005 | Mockridge et al. |
| 6,904,300 | B1 | 6/2005 | Maattanen et al. |
| 7,003,267 | B2 | 2/2006 | Ward et al. |
| 7,079,875 | B2 | 7/2006 | Robertson |
| 7,366,555 | B2 * | 4/2008 | Jokinen ............... H04M 1/0283 455/550.1 |
| 7,373,180 | B2 | 5/2008 | Swanson et al. |
| 7,420,903 | B2 | 9/2008 | Sakurai et al. |
| 7,551,949 | B2 | 6/2009 | Schworm |
| 7,554,624 | B2 | 6/2009 | Kusuda et al. |
| 7,558,594 | B2 | 7/2009 | Wilson |
| 7,599,709 | B2 * | 10/2009 | Kim .................... H04B 1/3816 379/428.01 |
| 9,239,591 | B2 * | 1/2016 | Kim .................... H04B 1/3816 |
| 9,450,631 | B2 * | 9/2016 | Kim .................... G06F 1/1624 |
| 2004/0004602 | A1 | 1/2004 | Cheng et al. |
| 2004/0061685 | A1 | 4/2004 | Ostergard et al. |
| 2004/0196270 | A1 | 10/2004 | Chiu et al. |
| 2005/0089159 | A1 | 4/2005 | Schrack |
| 2005/0130721 | A1 | 6/2005 | Gartrell |
| 2005/0134576 | A1 | 6/2005 | Lin et al. |
| 2006/0109258 | A1 | 5/2006 | Takisawa |
| 2016/0099739 | A1 | 4/2016 | Kim |
| 2016/0182695 | A1 * | 6/2016 | Kim .................... H04B 1/3816 455/575.4 |

FOREIGN PATENT DOCUMENTS

| | | |
|---|---|---|
| EP | 1496674 | 1/2005 |
| EP | 1603308 | 12/2005 |
| JP | 2003-110675 | 4/2003 |
| WO | 2005/061204 | 7/2005 |

OTHER PUBLICATIONS

Intellectual Property Office of India Application Serial No. 1235/KOL/2006, Office Action dated Jan. 27, 2015, 1 page.

* cited by examiner

CASE FOR A HAND HELD DEVICE

CROSS-REFERENCE TO RELATED APPLICATIONS

This application is a continuation of U.S. patent application Ser. No. 15/053,866, filed on Feb. 25, 2016, currently pending, which is a continuation of U.S. patent application Ser. No. 14/967,192, filed on Dec. 11, 2015, currently pending, which is a continuation of U.S. patent application Ser. No. 12/484,943, filed on Jun. 15, 2009, now U.S. Pat. No. 9,239,591, which is a continuation of U.S. patent application Ser. No. 11/602,748, filed on Nov. 21, 2006, now U.S. Pat. No. 7,599,709, which claims the benefit of earlier filing date and right of priority to Korean Patent Application No. 10-2006-0028094, filed on Mar. 28, 2006, the contents of which are all hereby incorporated by reference herein in their entirety.

BACKGROUND OF THE INVENTION

Field of the Invention

The present invention relates to a mobile device, and in particular to a housing assembly for a mobile device.

Discussion of the Related Art

FIG. 1 is a perspective view of a related art mobile device having a first body 110 slideably coupled to second body 120. The first body includes outer case 114, which is structured to receive display window 112 and auxiliary key pad 116. The display window cooperates with an underlying display, and the auxiliary keypad permits user input and operation of various functions of the mobile device. The second body includes main keypad 122, which is designed to receive input from a user.

Display window 112 and auxiliary keypad 116 are typically mounted as separate components in outer case 114. However, the manufacturing and assembly process is complicated because these elements are separate components.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a housing assembly for a mobile device includes a cover formed from optically transmissive material, and opaque material formed over a portion of the cover. The opaque material is arranged to define a display portion which is optically transmissive. The housing assembly further includes a frame sized to receive the cover, and a first housing structured to couple with the frame, such that the cover, the frame, and the first housing are structured to define an enclosure sized to contain electrical components for the mobile device.

In one aspect, the housing assembly further includes an input portion integrated with the cover. The input portion has a plurality of optically transmissive input regions, each defined by portions of the opaque material.

In one aspect, each of the plurality of optically transmissive input regions is shaped to define at least one of a character, symbol, and number.

In another aspect, the housing assembly further includes a touch pad positioned relative to a bottom side of the cover. The touch pad includes a separate light guide associated with each of the plurality of optically transmissive input regions.

In one feature, the housing assembly further includes at least one light source positioned relative to a bottom side of the touch pad. Each light source is associated with one or more of the light guides to provide light to the plurality of optically transmissive input regions.

In another feature, the housing assembly further includes a plurality of tactile elements projecting from the cover and individually associated with one of the plurality of optically transmissive input regions.

In yet another feature, the cover is shaped to define an opening, and the user input assembly is positioned relative to the cover, substantially covering the opening.

In one aspect, the user input assembly includes a plurality of keys structured to individually generate signals responsive to user contact.

In accordance with another aspect, the cover is shaped to define a plurality of openings, and the housing assembly further includes a plurality of keys each operatively associated with one of the plurality of openings of the cover, such that each of the plurality of keys individually generate signals responsive to user contact.

As another example, each of the plurality of keys includes one of a push-type key and a scroll-type key.

In yet another example, the housing assembly further includes a display located within the enclosure and positioned relative to the cover such that the display is operatively associated with the display portion.

In still yet another example, the housing assembly further includes a mounting surface located along a perimeter of the frame and sized to receive a bottom edge of the cover, a plurality of pins located on one of the cover or the mounting surface, and a plurality of pin receptacles located on a different one of the cover or the mounting surface. The plurality of pin receptacles positioned to correspond to the plurality of pins and being sized to fixedly receive an associated one of the plurality of pins.

In one aspect, the housing assembly further includes adhesive for coupling the cover with the frame.

In yet another feature, the housing assembly further includes a second housing having a key pad, while the first housing is structured to permit relative motion between the first housing and the second housing.

In still yet another feature, each of the cover and the frame are individually shaped to define cooperating openings which are operatively associated with a speaker.

In another aspect, one of the frame, the cover, and the first housing, is shaped to define an opening which is operatively associated with a microphone.

In accordance with another aspect, the housing assembly further includes an input portion integrated with the cover. The input portion having a plurality of optically transmissive input regions, each defined by portions of the opaque material. The housing assembly also includes a touch pad positioned relative to a bottom side of the cover, the touch pad having a separate light guide associated with each of the plurality of optically transmissive input regions, and at least one light source positioned relative to a bottom side of the touch pad. Each light source is associated with one or more of the plurality of light guides to provide light to the plurality of optically transmissive input regions.

In accordance with an aspect, the opaque material comprises either an opaque film or an in-mold injection opaque film.

If desired, the enclosure is sized to contain a communication module for wireless communication.

In accordance with an alternative embodiment, a housing assembly for a mobile device includes a first housing formed from optically transmissive material, and which has a wall extending along a perimeter of the first housing. Opaque material is formed over a portion of the first housing, the opaque material being arranged to define a display portion which is optically transmissive. A coupling structure is located on an inner portion of the first housing, and a second housing is used to couple with the first housing via the coupling structure. The first and second housings define an enclosure sized to contain electrical components for the mobile device.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or similar parts.

First of all, specific examples of slide-type mobile devices will be described, but such teachings apply equally to other types of mobile devices. Accordingly, the various teachings of the present disclosure may be implemented using, for example, slide-type, bar-type, folding-type, and swivel-type, mobile devices.

Figure 1:
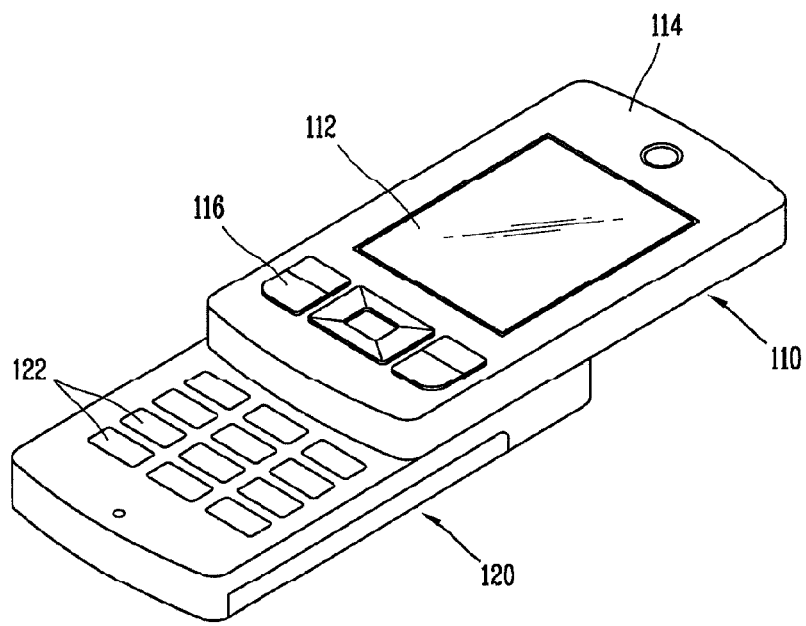
FIG. 1 is a perspective view of a related art mobile device having a first body slideably coupled to second body.
Figure 2:
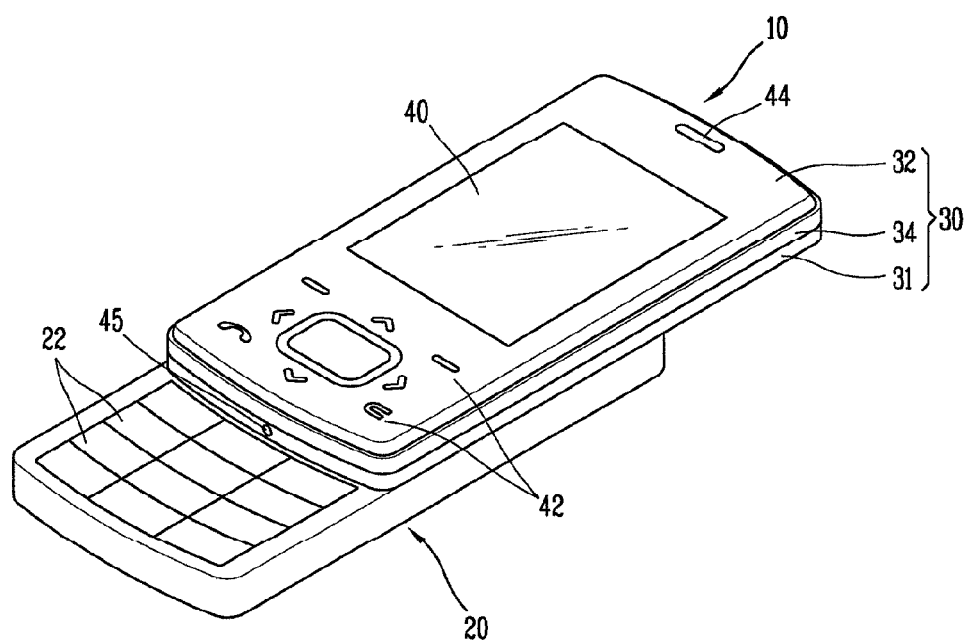
FIG. 2 is a perspective view of a slide-type mobile device in accordance with an embodiment of the present invention.

FIG. 2 is a perspective view of slide-type mobile device 10 in accordance with an embodiment of the present invention. Mobile device 10 includes first body 30 and second body 20. The first body is structured to define an enclosure to contain various electrical components necessary for the mobile device. In particular, first body 30 includes cover 32, frame 34, and housing 31. The frame is sized to receive cover 32. Typically, opaque material is formed over a portion of the cover such that the opaque material is arranged to define an optically transmissive display portion 40. The display portion is located on the cover to cooperate with an underlying display.

If desired, cover 32 may further include an integrated input portion. For instance, the cover may include a plurality of optically transmissive input regions 42. Similar to display portion 40, each of the input regions may be defined or bounded by portions of the opaque material formed over the cover.

Speaker aperture 44 is shown formed on one end of cover 32, while microphone aperture 45 is shown formed in the wall of frame 34. These elements respectively cooperate with an underlying speaker and microphone (not shown in this figure).

Second body 20 includes main key pad 22, which is designed to receive input from a user. The second body may also include a communication module (not shown) for transmitting and receiving signals, and a main printed circuit board (not shown) in which the communication module is mounted.

Figure 3:
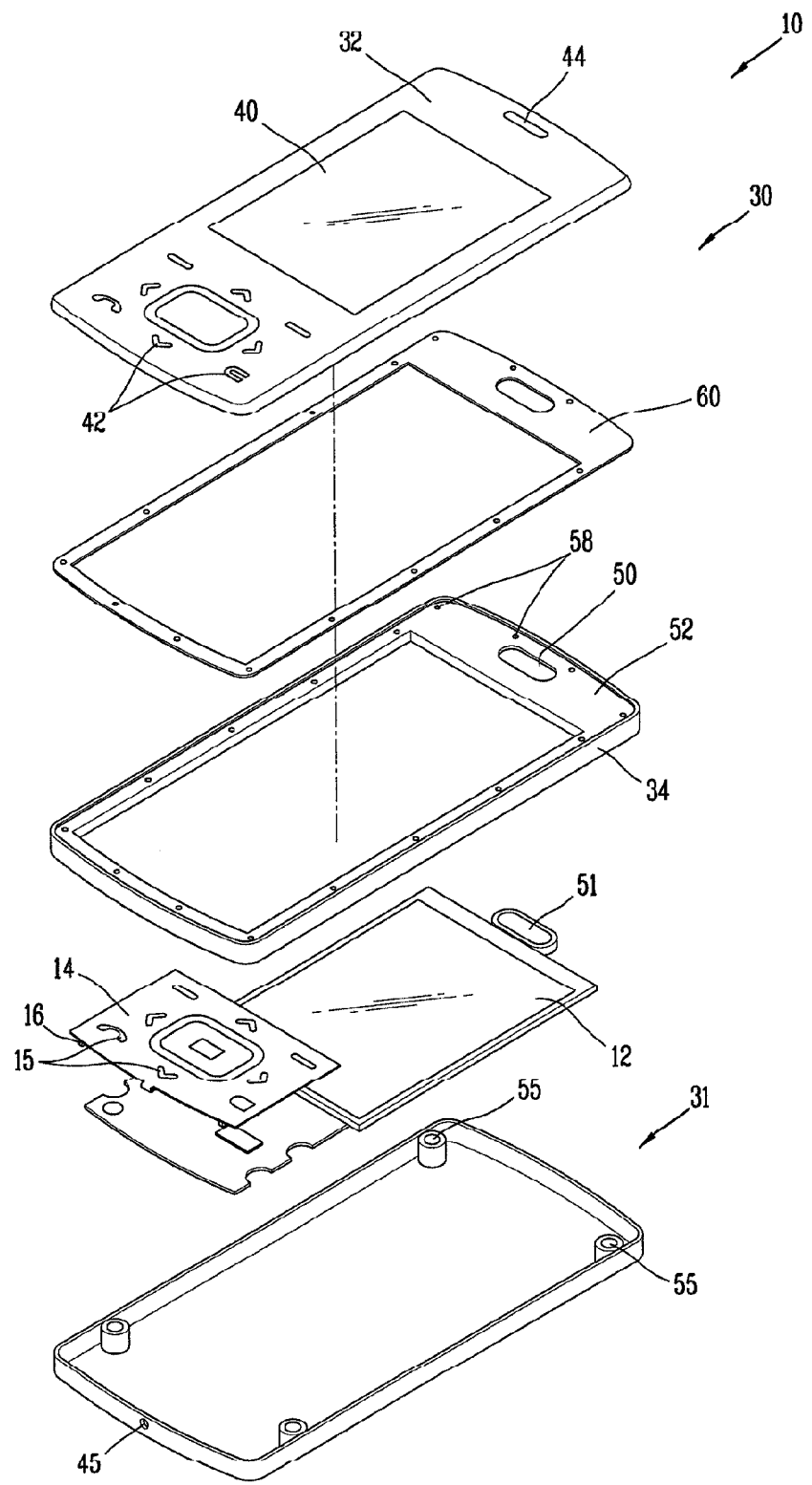
FIG. 3 is an exploded perspective view of the first body of FIG. 2.

FIG. 3 is an exploded perspective view of the first body of FIG. 2. This figure shows display 12 and touch pad 14, which may be positioned within first body 10. Coupling of cover 32 and frame 34 may be accomplished using, for example, adhesive 60. The adhesive may be positioned on mounting surface 52, which is shown located along an inner perimeter of the frame. Coupling of housing 31 and frame 34 may be accomplished using, for example, cooperating pins and pin receptacles.

For instance, as shown in FIG. 3, several pin receptacles 55 are positioned on an interior region of housing 31. These pin receptacles cooperate with pins and pin receptacles located on the bottom side of frame 34 (not shown in this figure). After assembly, display 12 is positioned relative to display portion 40, and touch pad 14 is positioned relative to a bottom side of input regions 42.

Touch pad 14 may be implemented using conventional touch pad technologies which are capable of detecting user manipulation or other contact with an associated one or more of input regions 42. During use, the touch pad generates signals which may be communicated to a printed circuit board, for example. Touch pad 14 may be positioned relative to the bottom side of cover 32 using known techniques (e.g., adhesive, tape, and the like). Suitable touch pads include, for example, pressure-sensitive touch pads, capacitance touch pads, and the like.

Touch pad 14 may also include one or more strategically located light guides 15. As shown, each light guide 15 is associated with an individual input region 42 of the cover.

As an example, the touch pad may be shaped to define an aperture which forms an individual light guide. In an embodiment, one or more light sources 16 may be positioned relative to the bottom side of touch pad 14. If desired, the light sources may be directly coupled to the touch pad. Light guides 15 are often implemented to permit light provided by light sources 16 to pass through touch pad 14, and consequently, optically transmissive input regions 42. If desired, optically transmissive material may be formed within some or all of the light guides. This feature enhances the structural integrity of the touch pad.

Light sources 16 may be implemented using known devices and structures which can provide light at the wavelength of interest to one or more input regions 42. Typical light sources include light emitting diodes (LEDs) and vertical surface emitting lasers (VCSELs), among others.

It is notable that light emitted by light sources 16 is not unnecessarily hindered by structures, which is common in conventional assemblies. More specifically, light emitted by light sources 16 reaches input regions 42 relatively unimpeded. This reduces the number of needed light sources, which consequently reduces the power requirements of the assembly.

Although possible, it is not necessary for each input region 42 to have an associated light source 16. In general, the number of light sources is fewer than the number of input regions. In some implementations, a single light source provides sufficient light to all input regions. Maximum light to the touch keys may be achieved by positioning each light source relatively close to an associated light guide 15.

Frame 34 is shown having speaker aperture 50, which corresponds with aperture 44 of cover 32. Both apertures are arranged to cooperate with speaker 51.

Figure 4:
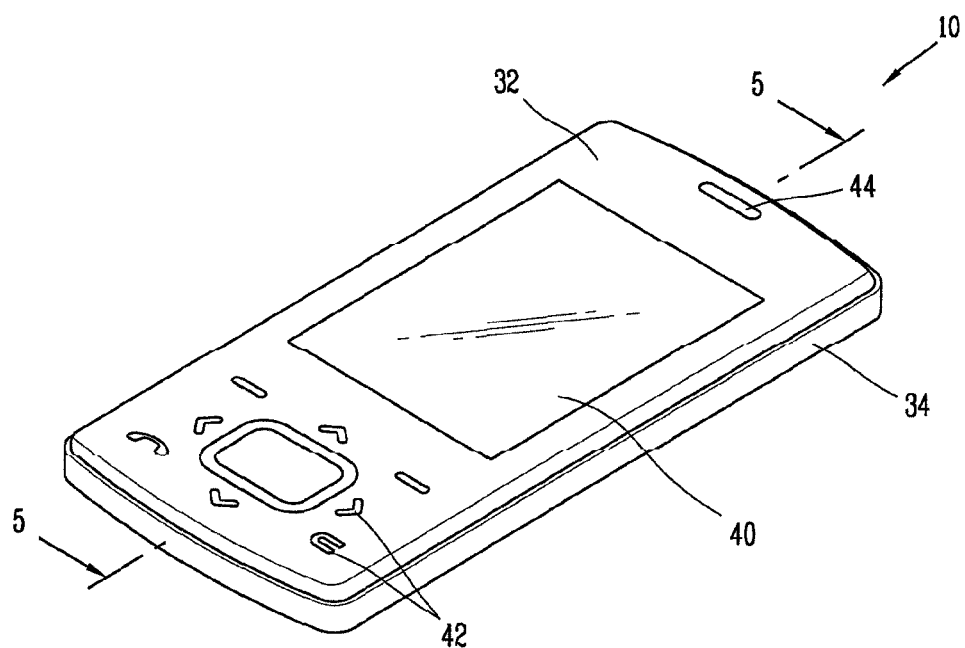
FIG. 4 is a perspective view of several components of the first body of FIG. 2.
Figure 5:
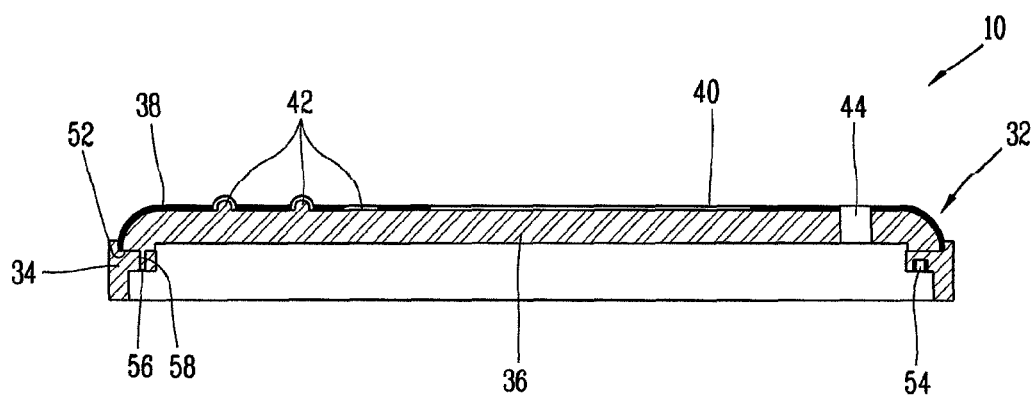
FIG. 5 is a cross-sectional view of the first body taken along line 5-5 of FIG. 4.

FIG. 4 is a perspective view of several components of first body 10 of FIG. 2, and FIG. 5 is a cross-sectional view of the first body taken along line 5-5 of FIG. 4. Note that housing 31 has been omitted from these figures for clarity.

In accordance with an embodiment, cover 32 is shown being substantially planar, with display portion 40 and input regions 42 being integrally formed in the cover. Cover 32 may be formed from any suitably ridged material which is optically transmissive. Methyl methacrylate polymer is one example of material that may be used for the cover. In addition, frame 34 may be formed of a polycarbonate material which has high impact strength and heat resistance. Cover 32 is typically formed from a different material than that used for frame 34, but this is not a requirement.

In an embodiment, cover 32 is formed from transparent material 36, and opaque material 38 is positioned on a surface of the transparent material. Input regions 42 and display portion 40 may be defined as areas of the cover which do not include the opaque material. Incident light will be transmitted by optically transmissive regions of the cover, and will not be transmitted by the portions of the cover which include the opaque material. Various types, shapes, and numbers of touch keys may therefore be formed using this technique.

If desired, opaque material 38 may be coated on the surface of transparent member 36 as part of an in-mold injection process. In-mold injection can reduce the number of steps necessary to form cover 32, offering increased manufacturing efficiency and lower production costs. Each of the optically transmissive input regions may be shaped to define one or more of a character, a symbol, and a number, among others.

If desired, one or more input regions 42 may be structured using a tactile element projecting from the cover. Each of these tactile elements may be individually associated with one of the input regions.

Tactile elements enhance the user's ability to interact with the input regions. The tactile elements may be formed in a variety of different shapes (e. g., circular, triangular, rectagonal, polygonal, star-like, and the like), as needed or desired. The opaque material may be formed over the tactile elements, or such material can be omitted from these elements so that they remain optically transmissive.

As an alternative to the use of adhesive 60 (or as a technique to enhance the effectiveness of the adhesive) coupling of cover 32 and frame 34 may be accomplished using cooperating pins and pin receptacles. For instance, cover 32 is shown having pins 56, which may be positioned around the perimeter of cover 32 in such a manner that they operatively couple with corresponding pin receptacles 58 of frame 34. Coupling of frame 34 to housing 31 may also be accomplished by cooperating pins and pin receptacles. For instance, pins may be used with pin receptacles 54 (frame 32) and pin receptacles 55 (housing 31).

Figure 6:
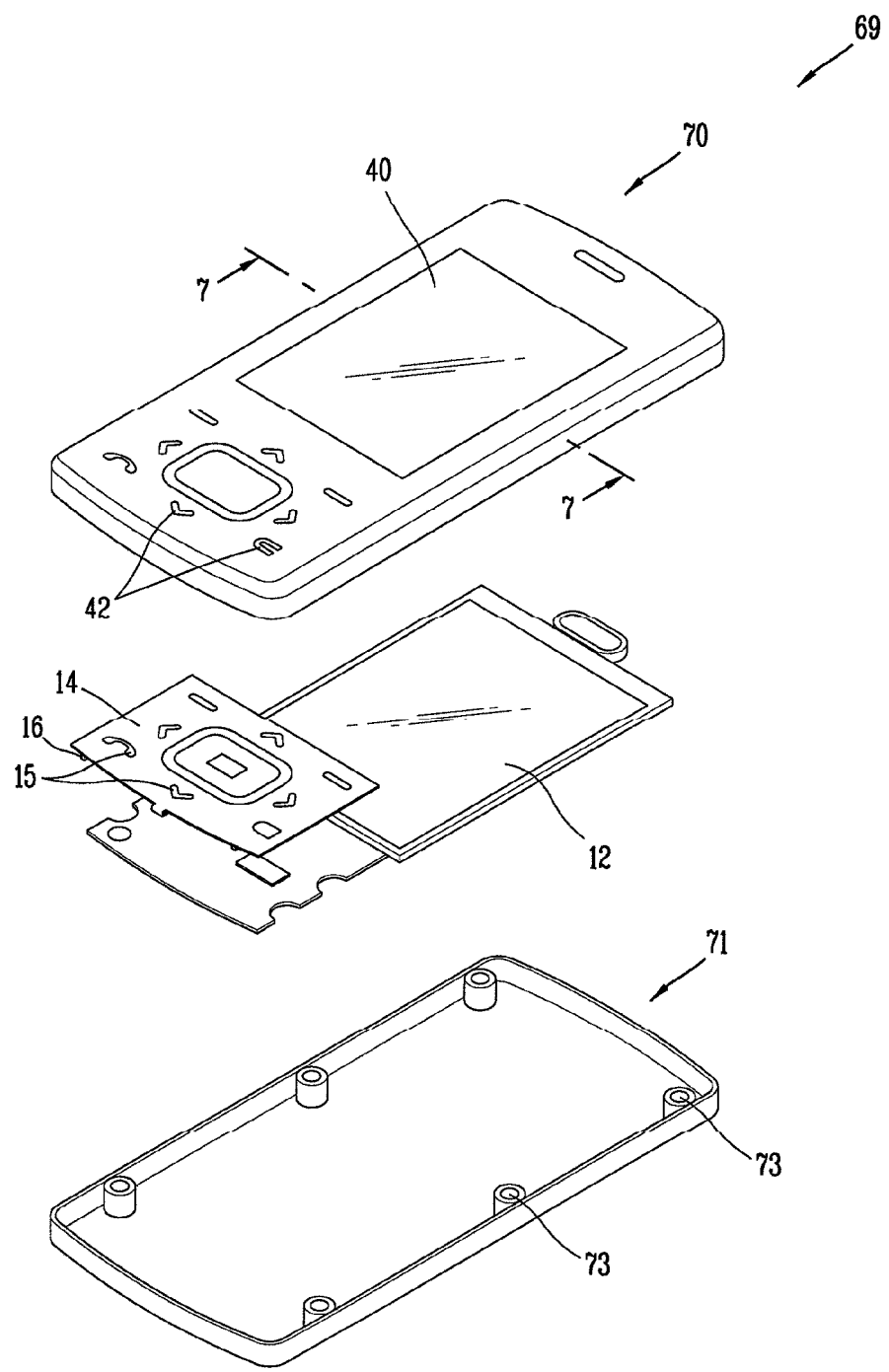
FIG. 6 is an exploded perspective view of a first body in accordance with an alternative embodiment of the present invention.
Figure 7:
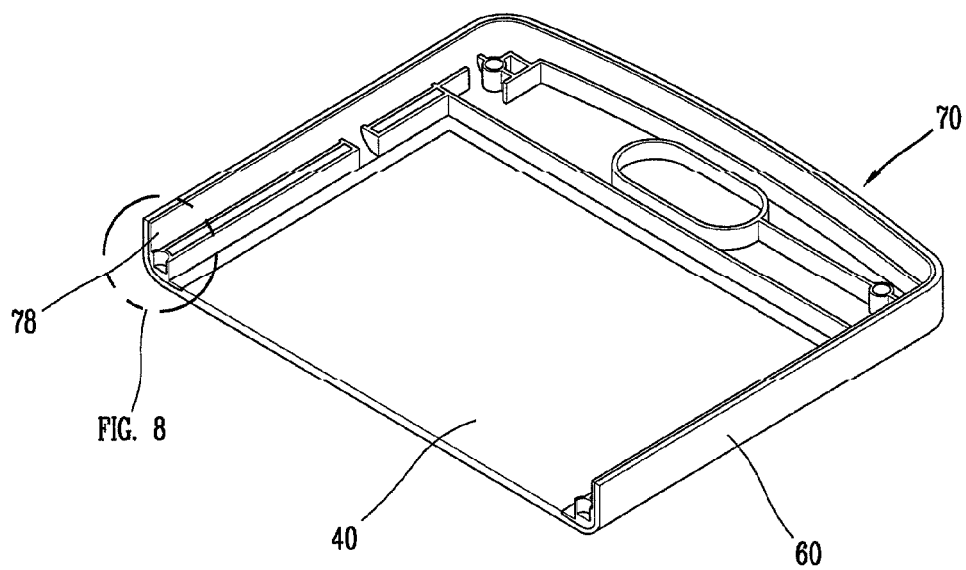
FIG. 7 is a perspective view of the first body taken along line 7-7 of FIG. 6.
Figure 8:
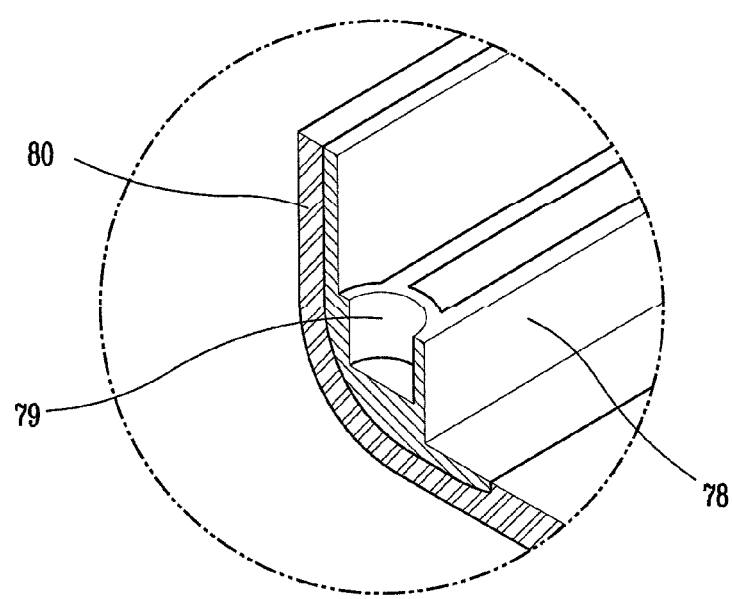
FIG. 8 is an enlarged view of a portion of the first body shown in FIG. 7.
Figure 9:
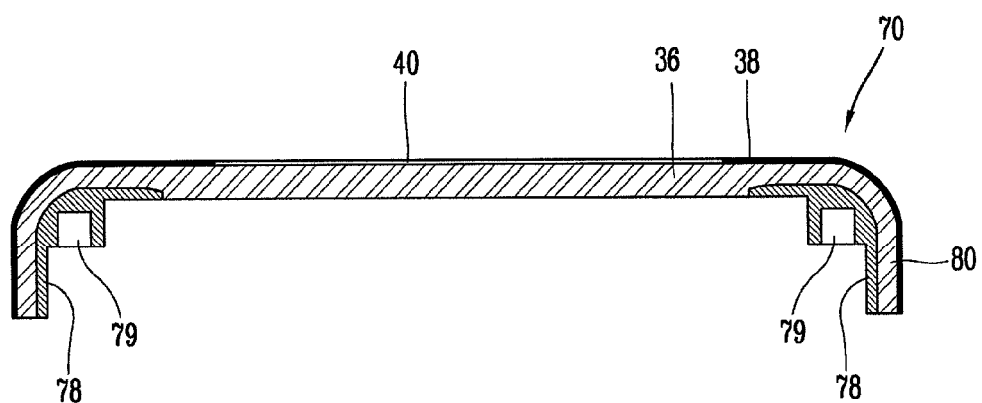
FIG. 9 is a cross-sectional view of the first body taken along line 7-7 of FIG. 6.

A body for a mobile device in accordance with an alternative embodiment of the present invention will be described in conjunction with FIGS. 6-9. In particular, FIG. 6 is an exploded perspective view of a first body, and FIG. 7 is a perspective view of the first body taken along line 7-7 of FIG. 6. FIG. 8 is an enlarged view of a portion of the first body shown in FIG. 7, and FIG. 9 is a cross-sectional view of the first body taken along line 7-7 of FIG. 6.

As shown, first body 69 includes first housing 70 and second housing 71. The first housing may be formed from optically transmissive material (as previously described) and typically includes wall 80 which extends along a perimeter of the housing. Coupling structure 78 is shown located on an inner portion of this wall of the first housing. The coupling structure 78 may be used to couple the first and second housings. The coupling structure may be formed within first housing 70 using, for example, double injection molding techniques. Double injection is beneficial in this regard since it reduces processing steps, offering increased manufacturing efficiency and lower production costs.

Wall 80 may be sized so that it extends past coupling structure 78. This permits the concealment of the coupling structure when the first and second housings 70, 71, are assembled. Typically, coupling structure 78 and first housing 70 are formed from different materials, but this is not a requirement.

First housing 70 may be formed from optically transmissive material 36 onto which opaque material 38 has been introduced. Materials 36 and 38 may be implemented using any of the techniques previously described. As a result, optically transmissive input regions 42 and display region 40 may thus be formed. Coupling structure may be formed using, for example, polycarbonate material.

Coupling of first and second housings 70, 71, may be accomplished using cooperating pins and pin receptacles. For instance, pin receptacles 79 are shown formed in coupling structure 78. Second housing 71 has corresponding pin receptacles 73 formed along various locations of the interior perimeter. The first and second housings can thus be assembled using pins which cooperate with the various pin receptacles of these housings.

Figure 10:
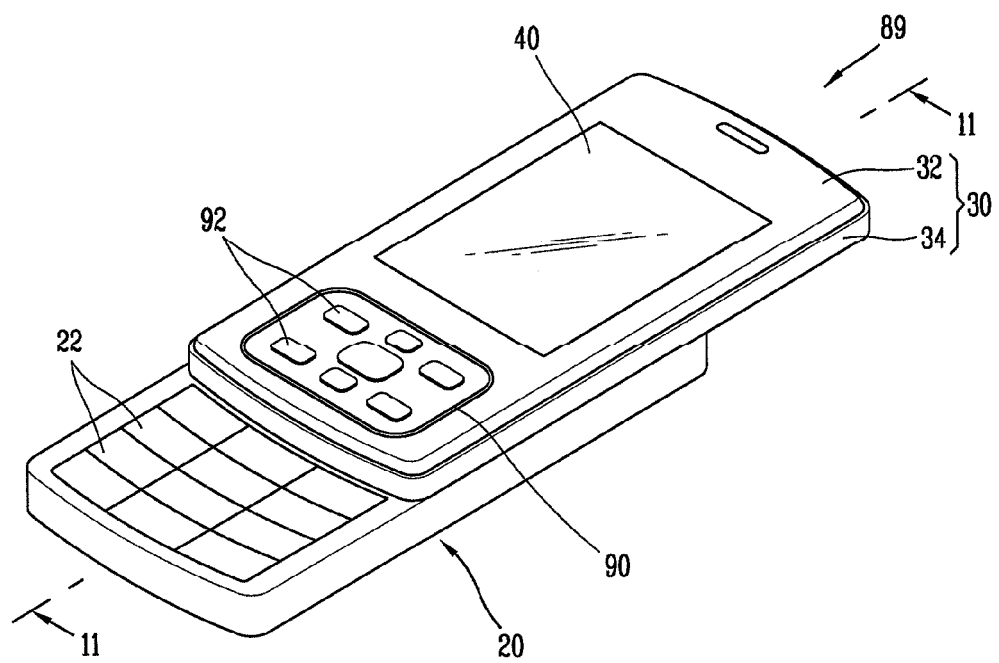
FIG. 10 is a perspective view of a slide-type mobile device in accordance with an embodiment of the present invention.
Figure 11:
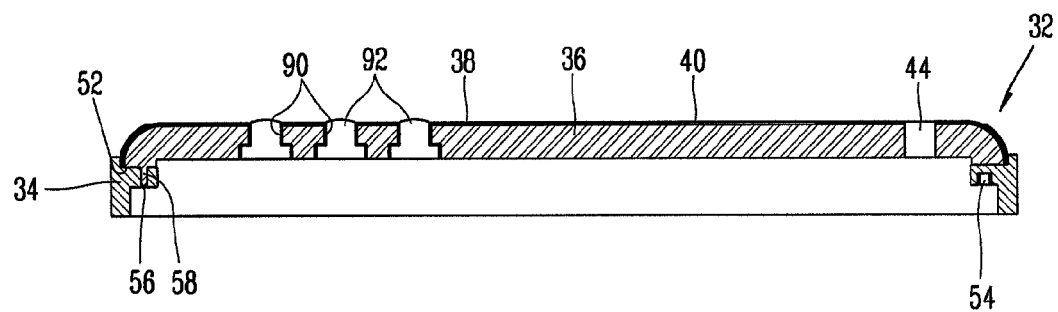
FIG. 11 is a cross-sectional view taken along line 11-11 of FIG. 10.

FIG. 10 is a perspective view of a slide-type mobile device 89 in accordance with an embodiment of the present invention. FIG. 11 is a cross-sectional view taken along line 11-11 of FIG. 10. The embodiment of FIGS. 10 and 11 is similar in many respects to that which is depicted in FIGS. 2-5. One difference relates to the user interface implemented. In particular, cover 32 of mobile device 89 is shaped to define a plurality of openings 90. A corresponding plurality of keys 92 are individually associated with one of the plurality of openings of the cover. Each of the keys (e.g., push-type, wheel-type, and the like) is structured to individually generate signals responsive to user contact, such as by pressing or other manipulation. Alternatives include providing multiple keys for a single opening, and the use of only one opening sized to receive one or more keys. An advantage of these embodiments is that a separate key assembly (or assemblies) may be used in conjunction with cover 32.

Figure 12:
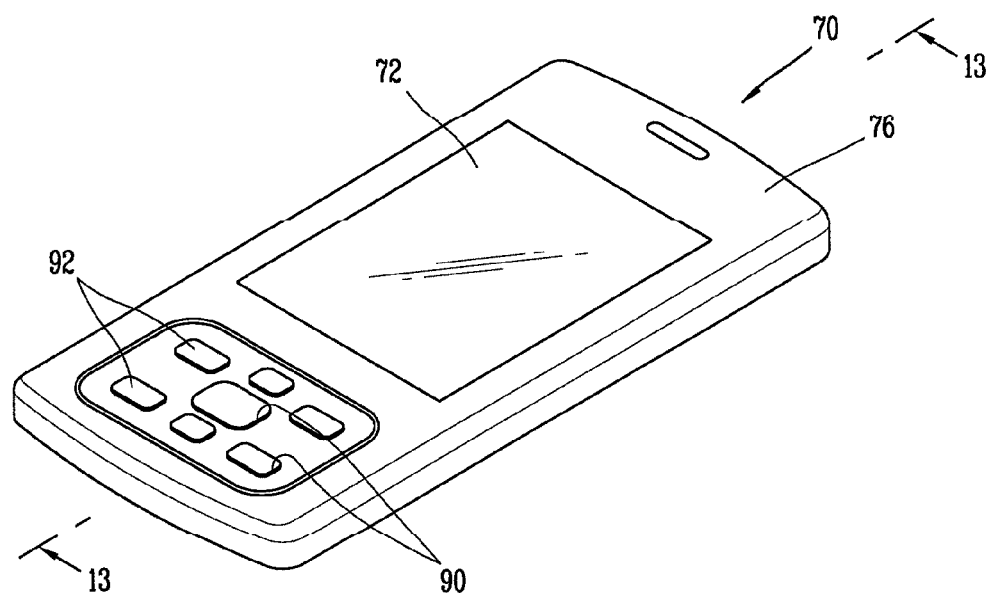
FIG. 12 is a perspective view of a housing assembly in accordance with an embodiment of the present invention.
Figure 13:
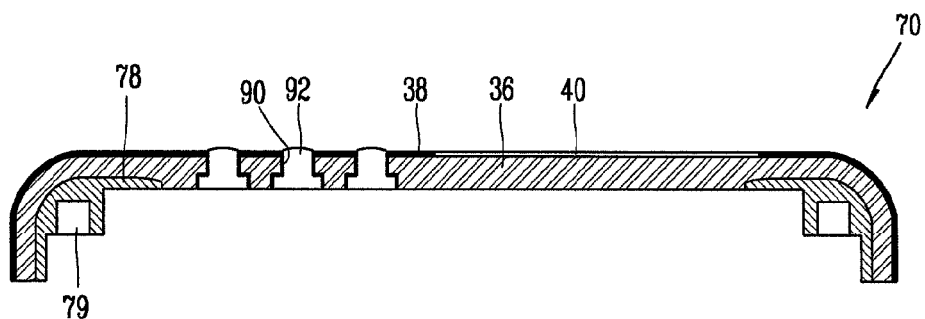
FIG. 13 is a cross-sectional view of the housing assembly taken along line 13-13 of FIG. 12.

FIG. 12 is a perspective view of a housing assembly in accordance with an embodiment of the present invention. FIG. 13 is a cross-sectional view of the housing assembly taken along line 13-13 of FIG. 12. The embodiment of FIGS. 12 and 13 is similar in many respects to that which is depicted in FIGS. 6-9. One difference relates to the user interface implemented.

For instance, first housing 70 is shaped to define a plurality of openings 90. A corresponding plurality of keys 92 is associated with one of the plurality of openings of the cover. Each of the keys (e.g., push-type, wheel-type, and the like) is structured to individually generate signals responsive to user contact, such as by pressing or other manipulation. Alternatives include providing multiple keys for a single opening, and the use of only one opening sized to receive one or more keys. Note that first housing 70 is typically configured with a suitable housing, such as second housing 71 (FIG. 6).

Figure 14:
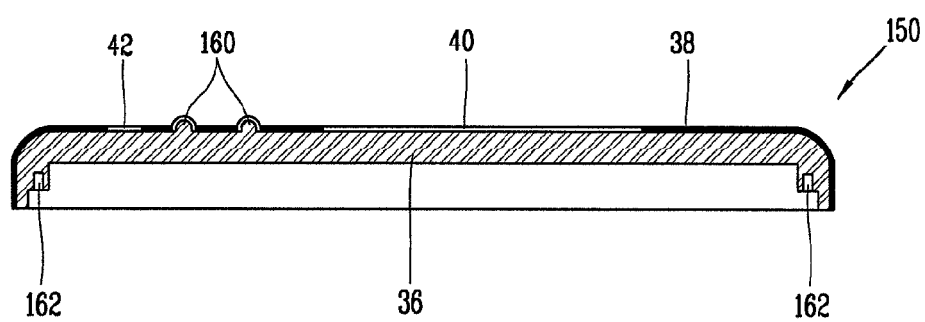
FIG. 14 is a cross-sectional view of a cover in accordance with another alternative embodiment of the present invention.

FIG. 14 is a cross-sectional view of cover 150 in accordance with another alternative embodiment of the present invention. This example is similar is some respects to the cover depicted in FIG. 5. One difference is that coupling of cover 150 is facilitated by pin receptacles 162, which are located along a walled portion of the cover. These pin receptacles may be positioned around the perimeter of cover 150 in such a manner that they operatively couple, via pins, with corresponding pin receptacles located in a lower housing (e.g., second housing 71 of FIG. 6).

Coupling of cover 150 is facilitated by pin receptacles 162, which are located along a walled portion of the cover. These pin receptacles may be positioned around the perimeter of cover 150 in such a manner that they operatively couple, via pins, with corresponding pin receptacles located in a lower housing (e.g., second housing 71 of FIG. 6). If desired, one or more input regions 42 may be structured as a tactile element projecting from the cover. Examples of such tactile elements are denoted as elements 160.

Figure 15:
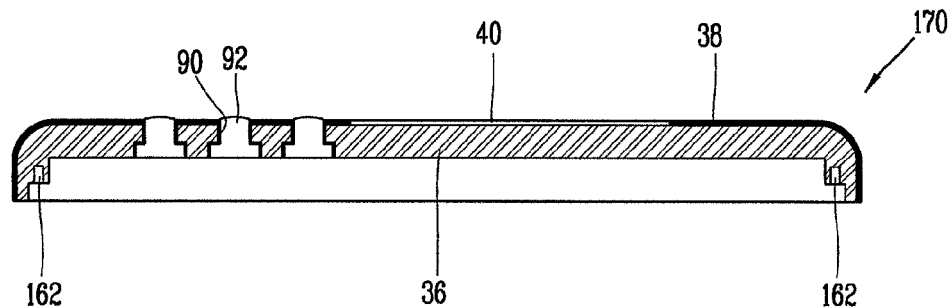
FIG. 15 is a cross-sectional view of a cover in accordance with yet another alternative embodiment.

FIG. 15 is a cross-sectional view of cover 170 in accordance with yet another alternative embodiment. This example is similar is some respects to the cover depicted in FIG. 14. One difference is that the input regions 42 of the cover of FIG. 14 have been replaced with key buttons 92. For instance, cover 170 is shaped to define a plurality of openings 90. A corresponding plurality of keys 92 is associated with one of the plurality of openings of the cover. The keys and corresponding openings may be implemented using any of the techniques previously described.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A mobile device comprising:
a cover formed of optically transmissive material;
opaque material coated on a portion of the optically transmissive material of the cover;
a display region formed at the cover, the display region being optically transmissive and bounded by the opaque material;
a frame coupled to the cover, the frame being formed of a different material from the optically transmissive material of the cover;
a display disposed below the display region of the cover; and
an input key structured to generate a signal in response to an input,
wherein an opening is formed at the cover and is bounded by the opaque material,
wherein the input key is positioned in the opening of the cover, and
wherein a top surface of the input key is exposed to the outside without being coated by the opaque material.

2. The mobile device of claim 1, wherein the top surface of the input key is formed in a shape corresponding to the opening of the cover.

3. The mobile device of claim 2, wherein the input key is a single key disposed at the cover.

4. The mobile device of claim 1, wherein a speaker aperture is formed at the cover and is bounded by the opaque material, and
wherein a speaker is aligned with the speaker aperture.

5. The mobile device of claim 4, wherein the opening of the cover is a single opening for the input key, and
wherein the display region is positioned between the speaker aperture and the single opening for the input key.

6. The mobile device of claim 1, wherein the input key is a push-type key disposed at the cover.

7. The mobile device of claim 1, further comprising an adhesive element to couple the frame to the cover.

8. The mobile device of claim 7, wherein the frame includes a mounting surface on which the frame is coupled to the cover.

9. The mobile device of claim 8, wherein the mounting surface is positioned relative to a first side of the cover.

10. A mobile device comprising:
a cover having an opening formed of optically transmissive material;
opaque material coated on a portion of the optically transmissive material of the cover,
wherein a display region is formed at the cover, and
wherein the display region is optically transmissive and is bounded by the opaque material;
a frame coupled to the cover;
a display disposed below the display region; and
an input key structured to generate a signal in response to an input,
wherein an opening is formed at the cover and is bounded by the opaque material,
wherein the input key is positioned in the opening of the cover, and
wherein a top surface of the input key is exposed to the outside without being coated by the opaque material, and is formed in a shape corresponding to the opening of the cover.

11. The mobile device of claim 10, wherein the input key is a single key disposed at the cover.

12. The mobile device of claim 11, wherein the opening of the cover is a single opening for the single key.

13. The mobile device of claim 12, wherein a speaker aperture is formed at the cover and is bound by the opaque material, and
wherein a speaker is aligned with the speaker aperture.

14. The mobile device of claim 13, wherein the display region is positioned between the speaker aperture and the single opening for the single key.

15. The mobile device of claim 10, wherein the input key is a push-type key disposed at the cover.

16. The mobile device of claim 10, further comprising an adhesive element to couple the frame to the cover.

17. The mobile device of claim 16, wherein the frame includes a mounting surface on which the frame is coupled to the cover.

18. A mobile device comprising:
a cover formed of optically transmissive material, the cover having a curved portion which is curved at one or more edge sides of the cover;
opaque material coated on a portion of the optically transmissive material of the cover;
a display region formed at the cover, the display region being optically transmissive and bounded by the opaque material;
a speaker aperture formed at the cover, the speaker aperture being bounded by the opaque material;
a speaker aligned with the speaker aperture;
a frame coupled to the cover, the frame being formed of a different material from the optically transmissive material of the cover;
a display disposed below the display region; and
an input key structured to generate a signal in response to an input,
wherein the cover includes a single opening within a lower side of the display,
wherein the single opening is bounded by the opaque material, and
wherein the input key is positioned in the single opening of the cover, and is exposed to the outside through the single opening of the cover.

19. The mobile device of claim 18, wherein the top surface of the input key is formed in a shape corresponding to the single opening of the cover.

20. The mobile device of claim 18, wherein the input key is a push-type key disposed at the cover.

21. The mobile device of claim 18, wherein the opaque material is coated to overlap at least part of the curved portion.

22. The mobile device of claim 18, wherein the display region is positioned between the speaker aperture and the single opening of the cover.

23. The mobile device of claim 18, further comprising an adhesive element to couple the frame to the cover.

24. The mobile device of claim 23, wherein the frame includes a mounting surface on which the frame is coupled to the cover.

25. The mobile device of claim 1, wherein the cover has a curved portion which is curved at one or more edge sides of the cover.

26. The mobile device of claim 25, wherein the opaque material is coated to overlap at least part of the curved portion.

27. The mobile device of claim 1, wherein the input key is a wheel-type key disposed at the cover.

28. The mobile device of claim 1, wherein the input key is one of a plurality of keys positioned in the opening of the cover.

29. The mobile device of claim 10, wherein the cover has a curved portion which is curved at one or more edge sides of the cover.

* * * * *